(12) United States Patent
Fisher et al.

(10) Patent No.: US 7,850,011 B2
(45) Date of Patent: Dec. 14, 2010

(54) SCREEN SYSTEM

(75) Inventors: George W. Fisher, Aberdeenshire (GB); Marshall G. Bailey, Berwick-Upon-Tweed (GB)

(73) Assignee: Axiom Process Ltd. (GB)

( * ) Notice: Subject to any disclaimer, the term of this patent is extended or adjusted under 35 U.S.C. 154(b) by 660 days.

(21) Appl. No.: 11/689,692

(22) Filed: Mar. 22, 2007

(65) Prior Publication Data
US 2007/0187303 A1 Aug. 16, 2007

Related U.S. Application Data

(63) Continuation-in-part of application No. 10/486,485, filed as application No. PCT/GB02/03711 on Aug. 12, 2002, now Pat. No. 7,216,768.

(51) Int. Cl.
B07B 1/49 (2006.01)

(52) U.S. Cl. ................ 209/405; 209/397; 209/399; 209/403; 209/404

(58) Field of Classification Search .............. 209/397, 209/399, 403–405
See application file for complete search history.

(56) References Cited

U.S. PATENT DOCUMENTS

| 1,397,342 | A | | 11/1921 | Sturtevant | |
|---|---|---|---|---|---|
| 3,092,573 | A | | 6/1963 | Lambert | |
| 3,968,053 | A | | 7/1976 | Rausch | |
| 4,744,898 | A | * | 5/1988 | Bailey | 210/236 |
| 4,816,153 | A | * | 3/1989 | Ando et al. | 210/445 |
| 5,332,101 | A | | 7/1994 | Bakula | |
| 5,346,053 | A | * | 9/1994 | Dorn | 198/399 |
| 5,735,409 | A | * | 4/1998 | Malmberg | 209/399 |
| 6,675,975 | B1 | * | 1/2004 | Cook et al. | 210/490 |
| 6,708,829 | B2 | * | 3/2004 | Robertson et al. | 209/405 |
| 2003/0042178 | A1 | * | 3/2003 | Robertson et al. | 209/405 |
| 2004/0007508 | A1 | * | 1/2004 | Schulte et al. | 209/403 |
| 2004/0074816 | A1 | * | 4/2004 | Seyffert et al. | 209/363 |

(Continued)

FOREIGN PATENT DOCUMENTS

DE 1258713 1/1968

(Continued)

Primary Examiner—Terrell H Matthews
(74) Attorney, Agent, or Firm—Gifford, Krass, Sprinkle, Anderson & Citkowski, P.C.

(57) ABSTRACT

The present invention provides a screen system (8) suitable for use in a vibratory screen apparatus (1), and comprising: a screen element (11) and a support frame (12) therefor, as well as novel screen elements (11) and mesh panels (19) therefor, and the use thereof. The screen element (11) consists essentially of a mesh panel (19) provided with first and second elongate support members (22, 23) extending along opposite end portions of the mesh panel (19). The support frame (12) has spaced apart first and second elongate frame elements (13, 14) for engagement with the screen element support members (22, 23) and further elongate frame elements (17, 18) extending there between for supporting the mesh panel (19). The screen element support members (22, 23) and said first and second frame elements (13, 14) are formed and arranged for secure interengagement in use of the screen system, with at least one of said screen element support members and the respective one of said first and second frame elements being formed and arranged so that when clamped together, the mesh panel (19) is securely held under tension against said further frame elements (17, 18).

22 Claims, 5 Drawing Sheets

U.S. PATENT DOCUMENTS

2008/0105598 A1 * 5/2008 Fisher et al. ................ 209/402

FOREIGN PATENT DOCUMENTS

| GB | 368026 | 3/1932 |
| GB | 554679 | 7/1943 |
| WO | WO-96/11070 | 4/1996 |
| WO | WO-97/47404 | 12/1997 |

* cited by examiner

SCREEN SYSTEM

FIELD OF THE INVENTION

The present invention relates to screen systems for use in vibratory screen apparatus suitable for use in liquid solid separation and classification including inter alia, the sifting of drilling mud, cuttings and like material derived from oil-well drilling.

BACKGROUND OF THE INVENTION

Conventional vibratory apparatus for sifting mud and like material in the oil industry generally utilise screens of either hook strip or pretensioned design. Hook strip screens generally consist of single or multiple layers of mesh bonded together, which are tensioned after mounting in the basket of the vibratory screen apparatus. Two opposed ends of the screen are fitted with a turn back element to form a hook strip which is hooked around a tension rail, the latter being attached to the side wall of the basket, typically via a tension bolt, though other loading means to apply tensioning and securing forces may be employed. Tightening the tension bolt moves the tension rail outwardly, towards the walls of the basket, thus applying tension to the screen. The screen is normally stretched over a crowned deck, giving an arcuate profile to the screen, so that rigidity of the screen is retained during vibratory motion.

Hook strip screens may be pretensioned prior to mounting in the basket by attachment of the screen mesh element to an apertured support plate—typically by means of an adhesive. Where a plurality of mesh layers is used, these would normally be pretensioned. In some designs, layers of fused mesh may be corrugated prior to mounting to an apertured support plate and the hooks applied thereafter to the mesh-plate combination.

Hook strip screens have a number of disadvantages including the complex and time consuming mounting of the screen members in the basket, which results in significant downtime of the vibratory screen apparatus and requires the use of multiple parts. Attaining the correct screen tension for the material to be sieved also involves intricate fine tuning and the screens are easily damaged if too much force is applied when tightening the bolts or loading means to tension the screens. A further disadvantage is the relatively poor sealing between the screen and basket. The metal on metal seal often results in leakage with unscreened material passing through gaps between the screen and the basket, and mixing with already screened material below the mesh screen. Attempts to overcome the poor seal by placing rubber strips or gaskets at the metal/metal interfaces have proved unsatisfactory. These require intricate and time consuming fitting and frequently work loose during vibration and become lost or lodged in the vibratory machine, obstructing and damaging the machinery. In addition applying tension to the screen when tightening the tension bolt or loading means gives rise to additional stresses over and above those already suffered by the machine framework due to the vibratory motion, thereby possibly resulting in deterioration of the framework.

Pretensioned screens generally comprise one or more layers of mesh permanently bonded under tension onto a generally rigid steel and/or plastics material apertured plate support frame. The mesh screen may be flat, or crowned. The screen and frame is inserted into the basket as a unit, requiring no adjustment to the tension of the screen. The screen and frame unit is normally secured in the machine by clamping it from above or below by, but not restricted to, hydraulic pistons, inflatable clamping bags, bolts, or tapered elements.

Conventional pretensioned screen units with integral support frames have significant disadvantages being bulky, heavy and difficult to handle, transport and store; all very major considerations for use on off shore installations where all of these are at a very high premium. The design is complex and the frames expensive to construct. Typically plastic injection moulding is used which is an inflexible method of construction. The frames utilise large amounts of material all of which require disposal when the screen units are replaced, which is both inconvenient and expensive and has a negative impact on the environment.

Attempts to address some of these problems have been made (GB 2245191) by using a filter screen assembly comprising a main frame of moulded plastics material, subdivided by cross pieces which secure a stretched screen mesh. When a sub area of mesh is damaged it may be plugged with a module, snap fitted in place of the mesh. These screen assemblies, however, are very complex in structure with many of the disadvantages and associated expense of conventional pretensioned screens and, in addition, the inconvenience, storage and additional material requirements of the modules.

A further problem that arises with known screen systems is that due to the extra weight of the material being processed which is concentrated, in use of screening apparatus at the back (upstream) end thereof. The screen mesh in that area is subjected to particularly heavy wear resulting in the frequent need for replacement thereof. This problem has previously been addressed by using coarser heavy duty mesh in that area, but this inevitably results in reduced screening performance of the screening apparatus.

SUMMARY OF THE INVENTION

It is an object of the present invention to avoid or minimize one or more of the above disadvantages.

In one aspect the present invention provides a screen element suitable for use in a vibratory screen apparatus having a screen element support frame provided with spaced apart first and second elongate frame elements and further elongate frame elements extending between said first and second frame elements for supporting the mesh panel of a said screen element, said screen element consisting essentially of a mesh panel provided with first and second elongate support members extending along opposite end portions of said mesh panel, said screen element support members being formed and arranged for secure interengagement with said first and second frame elements, in use of the screen element, with at least one of said screen element support members being formed and arranged so that when clamped to the respective one of said first and second frame elements said mesh panel is securely held under tension against said further frame elements.

It will be appreciated that the screen element support members could have a substantially unitary form, or could be in the form of an assembly. In the former case there could, for example, be used a first mesh engaging or anchoring, support member portion bonded to a second, clamping force receiving, support member portion by means of adhesive and/or by welding or otherwise fusing together. In the latter case there could, for example, be used a said first support member portion which is captively interengaged with and/or secured to a said second support member portion using mechanical fastener means such as screws, staples, rivets etc.

In another aspect the present invention provides a screen system suitable for use in a vibratory screen apparatus, said screen system comprising:

a screen element consisting essentially of a mesh panel provided with first and second elongate support members extending along opposite end portions of said mesh panel; and a support frame for said screen element, said support frame having spaced apart first and second elongate frame elements for engagement with said screen element support members in use of the screen system, and further elongate frame elements extending between said first and second frame elements for supporting said mesh panel of said screen element;

said screen element support members and said first and second frame elements being formed and arranged for secure interengagement in use of the screen system, with at least one of said screen element support members and the respective one of said first and second frame elements being formed and arranged so that when clamped together, in use of the screen system, said mesh panel is securely held under tension against said further frame elements.

Preferably both first and second support members and the respective elongate frame elements are formed and arranged for clamping together so as to apply a tensioning force to the screen element to securely hold the mesh panel, under tension against the further frame elements. Where only one of the first and second support members and the respective elongate frame element is formed and arranged for secure interengagement by clamping together as described above, the other may utilise any convenient form of secure interengagement such as one or more hook elements captively engaging in a hook engaging element such as a loop, recess, aperture or the like. It will be appreciated moreover that the hook element(s) may have various different forms such as for example a mushroom shape which can be captively engaged in a keyhole aperture etc.

It will be understood that the mesh panels may be pretensioned by being secured onto apertured support plates, or may rely on the tensioning forces applied via the support member(s). In the former case it will further be appreciated that part of the support plate may be used to constitute at least one of the first and second screen element support members. Thus, for example, an elongate end portion of the support plate could be cranked into a hook form and/or provided with hook or other elements for interengagement with suitable hook engaging elements or the like on the respective one of the first- and second frame elements.

It will be appreciated that the function of the apertured support plates is essentially to support the mesh of the mesh panel with as little interference as practicable with the screening function of the mesh—by minimizing occlusion thereof. Thus in the general context of the screen elements of the invention it should be understood that references to "mesh panels" herein, includes mesh panels in the form of mesh secured to any such apertured support panels unless the context specifically requires otherwise.

It will also be appreciated that the mesh panel extending between said first and second support members may be in a form of a single continuous area of mesh, or could be made up of a plurality of mesh panel sections interconnected along their adjoining edges by any suitable means such as stitching, bonding, or by releasable interengagement of suitable connectors, for example, ones similar to the hook element type of support member described above. This can be advantageous in order to facilitate handling and installation of the screen elements to the support frames.

It will further be appreciated that the mesh panelling in a screen system of the invention, or even within an individual screen element, could be made up of mesh panels of a uniform mesh aperture size and/or shape or, if desired, mesh panels of different mesh size and/or shape could be used. It will also be understood that individual mesh panels could have a uniform mesh aperture size and/or shape or could have a plurality of different mesh aperture sizes and/or shapes, for example, a progression of increasing mesh aperture size from one part to another of the mesh panel. Conveniently mesh panels of variable mesh aperture size could be made by varying the inter-weft and/or inter-warp spacing along or across the weave of a woven mesh panel.

In the case of pretensioned mesh panels supported on apertured support plates, the apertured support plates could have a uniform aperture size or, if desired, there could be used support plates with apertures of two or more different aperture sizes, for example a series of apertures of progressively increasing aperture size. It will also be understood that, where two or more screen elements are mounted on a single support frame, each of the respective support plates could have a different apertures size and/or shape. Thus individual support plates could have a uniform aperture size and/or shape or could have a plurality of different aperture sizes and/or shapes, for example, a progression of increasing aperture size from one part to another of the plate. It should also be appreciated that where an apertured support plate is used, the mesh secured thereto need not necessarily be pretensioned.

Conveniently mesh panels of variable mesh aperture size could be made by varying the inter-weft and/or inter-warp spacing along or across the weave of a woven mesh panel.

Thus in a further aspect the present invention provides a mesh panel of variable mesh aperture suitable for use in a vibratory screen apparatus.

Thus with a screen system of the present invention, there may be used a screen element of particularly simple and economical construction which can be treated as disposable, whilst providing the necessary rigidity and support therefor, in use of the screen system, by means of a said support frame which can readily be reused with successive replacement screen elements. In principle it would be possible to replace just the mesh panel of a screen element of the invention but this is generally less convenient.

The screen systems of the invention are generally mounted across the mouth of a basket using a clamping system to secure the screen element and support frame together, on said basket. Various forms of clamping system may be used which apply a force to said first and second elongate support members of the screen element so as to urge them into contact with respective ones of said first and second frame elements. Advantageously said elongate support members and first and second frame elements are formed and arranged so that when the clamping system is activated to apply said force to said first and second screen support members, said first and second screen support members are urged away from each other so as to tension them across said further frame elements.

In one particular simple and convenient form of the invention, at least one of a clamping force receiving face and a first or second frame element engaging face, of said first and second screen support members is inclined relative to a principal plane of the screen element, so that when a clamping force is applied by said clamping system to said first and second support members, in use of the screen system, said support members are clamped into engagement with said first and second frame elements, and a force component is exerted on each of said support members so as to urge them away from each other. In principle a clamping force could instead (or additionally) be applied in a reverse sense i.e. the first and second frame elements are clamped into engagement with said first and second support members (with a force component being exerted on the support members to urge them away from each other as before), and it should be understood that such variants are also included within the broadest scope of the present invention.

With this preferred form of the invention, the securing and support of said screen elements to said support frames, can be readily achieved without the need for multiple accessory parts and intricate adjustments and with sufficient security to be retained in the required position use in vibratory screen apparatus despite the high gravitational (G) forces experienced in such use.

It will be appreciated that the angle of the inclined face relative to a principal plane of the screen element may be varied so to provide different relative magnitudes of the support member to frame element clamping forces and screen element tensioning forces obtained from a given applied clamping force, when the screen system of the present invention is in use with a vibratory screening apparatus, in order to obtain a desired screen tension etc in any given case etc. In general there may be used an angle in the range from 5° to 85°, preferably from 30° to 60°, for example about 45°. The support member to frame element clamping force and the screen element tensioning force should generally be selected in the light of the strength of the mesh (and/or any support plate therefor) of the screen element and the vibratory G forces encountered in use of the machine. Where there is used a pretensioned mesh panel with an apertured support plate, the clamping of the screen element to the support frame would not normally have any significant effect on the tension in the mesh. Thus, the mesh itself already having been pretensioned to the required tension, it is only necessary to clamp the screen element with sufficient force, to prevent any movement thereof independently of the support frame. Such arrangements are therefore generally easier to use than those in which the clamping force is used to tension the mesh itself to the required screening tension.

In another particularly simple and convenient form of the invention at least one of said first and second screen support members for engagement with said first and second frame elements has a cam portion formed and arranged for interaction with the respective frame element, so that when a clamping force is applied by said clamping system to a clamp force receiving face of said at least one of said first and second support members, in use of the screen system, to clamp said support member(s) into the respective one of said first and second frame elements, a said support member(s) is rotated relative to said frame element, so as to tension the screen element so that the mesh panel is securely held under tension against said further frame elements.

As with the previous form of the invention the clamping force could instead (or additionally) be applied in a reverse sense, and it should be understood that such variants are also included within the broadest scope of the present invention.

Various suitable clamping systems are known in the art such as hydraulic pistons, inflatable clamping bags, bolts or other screw operated devices, wedging or camming devices, etc. Conveniently the same clamping mechanism is used both to secure the screen system in said basket and to secure said screen support members, and said first and second frame elements, together. Nevertheless separate clamping systems could also be used if desired. One particularly suitable form of clamping system comprises a collapsible tube filled with pressurized fluid such as compressed air or a liquid such as water or hydraulic fluid as described in more detail in Patent Publications GB2176424A and GB2176425A.

The screen system of the present invention can be readily used in existing screen vibratory machinery (of hook-strip and pretensioned design) with clamping systems generally known in the art, with little or no modification, thereby enabling users of existing systems readily to bring it into use at minimal cost.

It will also be appreciated that the support frame could include additional elongate frame elements and/or further frame elements disposed between said first and second frame elements and further frame elements, in order to provide additional support to the screen mesh panel Where a plurality of screen elements is supported on a single support frame—which normally remains in place in the screening apparatus when the screen elements are replaced, the screen elements are advantageously provided with readily releasable interengagement elements such as hooks and apertures, for connecting the screen elements together in order to facilitate insertion and withdrawal of the screen elements into and from the screening apparatus. Having regard also to the fact that the support frames are usually recessed to a greater or lesser degree within the screening apparatus, the support frame is advantageously provided at a proximal end portion thereof with a guide device formed and arranged so that when a screen element is inserted into the screening apparatus it is guided up and over the proximal end of the support frame to avoid fouling thereof.

The support frame is generally used to support a single screen element. If desired, though, a single support frame could be formed and arranged so as to support a plurality of screen elements disposed generally side by side, abutting or cascading across said support frame, supported by additional (intermediate) frame elements between the elongate first and second frame elements. Said screen elements may be secured to such intermediate or interior support frame elements by means of hooks, pins. Alternatively, as described hereinbefore, a single support frame may be used to support a (single) screen element made up of a plurality of releasably interconnected mesh panel sections, without the need for such intermediate support frame elements.

Preferably the further frame elements extending (transversely) between said first and second frame elements, which support said screen mesh panel when said screen system is secured to the support frame, have convexly arcuate support surfaces to form a crown deck, as is customary in the vibratory screen apparatus art, so that the supported screen mesh panel adopts a generally part-cylindrical or part elliptical-section form.

It will be appreciated that the support frame may be of any suitable material known in the vibratory screen apparatus art including but not limited to plastics such as glass reinforced polyester and/or polyethylene, polypropylene, polyamide etc. or a blend thereof, metal such as galvanised steel or advantageously stainless steel.

As noted above, the mesh panel may be in the form of a plain mesh, or alternatively in a pre-tensioned form in which a mesh is secured e.g. by means of adhesive or fusing, onto or into an apertured lightweight flexible support plate, or plastic coating thereon etc. The apertured support plate may be of any suitable material including metal, plastics material, or glass or carbon fibre reinforced plastics, although preferably there is used plastics coated metal, especially plastics coated steel. Conveniently the apertured support plate is manufactured by means of punching suitably sized apertures in the support plate, especially using computer controlled punching apparatus. This has the advantage of affording particular flexibility in relation to the production of support plates with various different aperture sizes (whether within the same support plate or in different support plates). Various other techniques well known in the art can also be used for forming the apertures, such as for example, laser cutting. Also in the case of support plates made of plastics materials, especially fibre and/or wire reinforced plastics materials, the apertures are conveniently formed by producing the apertured support plates by means of techniques such as injection moulding.

With support plates formed of punched metal, it should be noted that the punching process can introduce a degree of bowing into the plate. Given that the mesh is normally attached to the "smooth" side of the punched plate which is also the concave side of the bowed plate, and indeed pretensioned mesh can itself impart a degree of bowing to the plate when it is secured to the support plate, it is then necessary to apply force to the plate so as to reverse the bowing therein, so that it can be mounted onto a support frame with convex further frame elements across which the mesh panel of the screen element is supported. Advantageously therefore such a bowed plate would be subjected to a process such as rolling so as to take out or reverse to a greater or lesser extent any undesirable bowing, prior to securing the suitably tensioned mesh thereto. By avoiding in this way any bowing in the screen elements which differs substantially from that of the support frame further elements, not only is installation and removal of the screen elements facilitated, but also the clamping force is more efficiently utilized.

In addition it will be understood that the mesh panel could comprise a single mesh layer or a plurality of superposed mesh layers which are held together onto said first and second elongate support members.

The or each mesh panel may be of any suitable form known in the vibratory screen apparatus art depending on the material being screened and other screening conditions. Typically there may be used mesh panels with mesh screen sizes in the range from 10 to 400 (wires per inch)—corresponding to mesh aperture diameters of around 2.5 mm to 0.03 mm. The mesh panels are generally fabricated from metal wire, typically of a suitable metal such as stainless steel, phosphor bronze, etc.

In still a further aspect the present invention provides a method of mounting a screen element of the present invention in a vibratory screen apparatus which has a basket provided with screen system support runners formed and arranged for sliding insertion and removal of a screen system of the present invention comprising a said screen element and a support frame therefor, wherein said support runners are provided with at least one clamping device, said method comprising the steps of inserting a said screen element into said basket so as to be supported on a said support frame in said support runners; and activating said at least one clamping device so as to clamp said screen element securely together with said support frame to said support runners.

Various kinds of runner may be used including support runners in the form of various male and/or female formations on or in the basket sides providing runner surfaces for generally captively supporting the screen element supporting members. Thus, for example, there could be used a support runner in the form of a (female) channel or a pair of parallel (male) flanges. Advantageously the lower runner surfaces of the opposed runners are downwardly inclined towards each other so that when correspondingly inclined engagement surfaces at the underside of the support frame seat thereon, the support frame is automatically centralised in the runner supports of the screening apparatus.

In another aspect the present invention provides a vibratory screen apparatus provided with a screen system of the present invention.

In yet another aspect the present invention provides a method of screening a fluidised particulate material suspended in a liquid medium, comprising the steps of providing a vibratory screen apparatus with a screen system of the present invention; mounting the screen element and screen element support frame in an at least one basket of said apparatus so as to be clamped together to said basket; activating a vibratory unit of said vibratory screen apparatus: and feeding said fluidised particulate material onto an upper surface of said screen element.

In yet another aspect, the present invention provides a screen mesh panel suitable for use in a screen element for a vibratory screening apparatus having a screen element support frame provided with spaced apart first and second elongate frame elements and further elongate frame elements extending between said first and second frame elements for supporting said mesh panel of said screen element and said screen element consisting (essentially) of a screen mesh panel provided with first and second elongate support members extending along opposite ends of said mesh panel, said screen element support members being formed and arranged for secure interengagement with said first and second frame elements in use of the screen element with at least one of said screen element support members being a clamping force receiving support member formed and arranged so that when clamped to the respective one of said first and second frame elements, said mesh panel is securely held under tension against said further frame elements, said screen mesh panel consisting essentially of at least one mesh layer secured to an apertured support plate and at least one elongate clamping force receiving support member anchorage portion formed and arranged for secure anchoring to the clamping force receiving portion of said support member.

It will be appreciated that various different forms of clamping force receiving support member anchorage portion may be used. Most conveniently, though, there is used an elongate section formation, advantageously with at least one enlarged thickness head portion and/or ratchet tooth formation, for push-fit and/or lateral sliding interengagement with a corresponding female formation of the mesh panel clamping force receiving portion of said support member. Suitable sections include those illustrated in the accompanying drawings.

BRIEF DESCRIPTION OF THE DRAWINGS

Further preferred features and advantages of the invention will appear from the following detailed description given by way of example of some preferred embodiments illustrated with reference to the accompanying drawings in which.

DETAILED DESCRIPTION OF THE PREFERRED EMBODIMENTS

Figure 1:
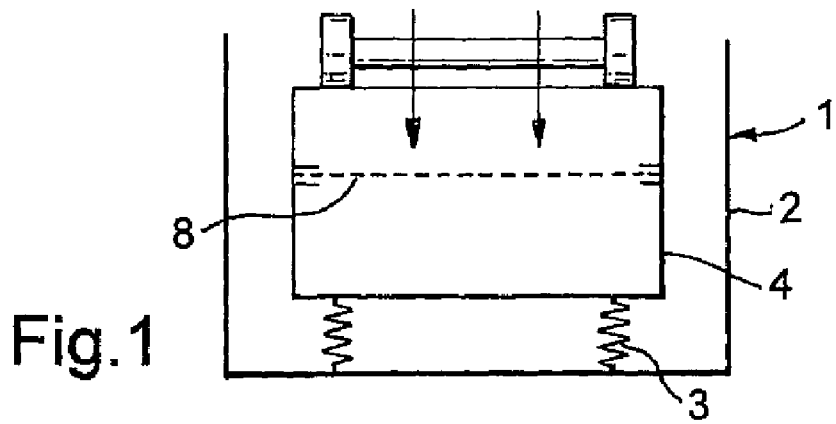
FIG. 1 is a schematic elevation of a vibratory screen apparatus provided with a screen system of the present invention.

FIG. 1 shows schematically a vibratory screen apparatus 1 with an outer housing 2 in which is mounted on springs 3 a basket unit 4. Each basket 5 of the basket unit 4 (see also FIG. 2) is generally box shaped with a pair of circumferentially extending inwardly projecting flanges 6 at an intermediate height on the basket walls 7, for supporting a screen system of the invention 8 as typically found in existing pretension screen vibratory machinery. A vibrator unit 9 is secured to the top 10 of the basket unit 4. FIG. 4 shows a screen system 8 comprising a screen element 11 clamped to a support frame 12 (also shown in FIG. 3) between the basket flanges 6.

The support frame 12 comprises first and second elongate frame elements 13, 14 at opposite end portions 15, 16 and further elongate, third and fourth, frame elements 17, 18 interconnecting them.

The screen element 11 comprises a mesh panel 19 having cranked opposite end portions 20, 21 anchored in first and second elongate screen support members 22, 23. The screen support members 22, 23 are of generally wedge shaped section with an upper generally horizontally extending clamping force receiving face 24 and a first or second frame element engaging face 25 inclined downwardly at an angle of about 45° thereto (and thus inclined to the generally horizontally extending principal plane of the screen element), for engagement with a correspondingly inclined support face 26 of the first or second frame element 13, 14.

The support frame 12 with the screen element 11 positioned thereon, is supported at each end portion 15, 16 on a lower one 6a of the respective flanges 6. A clamping device in the form of an inflatable tube 27 is secured 28 to the upper one 6b of the respective flanges 6 so that it extends between the upper flange 6b and the clamping force receiving face 24, so that when the tube 27 is filled with pressurised fluid, it presses down onto said face 24 so as to exert a clamping force C onto the screen element support member 22 and through it onto the respective first or second frame element 13, 14 (see FIG. 5). In this way the screen element 11 is clamped to the support frame 12, and the screen system B comprised thereby is clamped securely to the basket 5.

Figure 5:
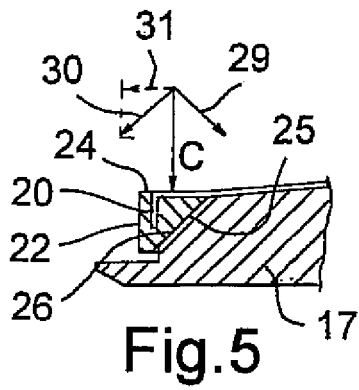
FIG. 5 is a detail view of one end of the screen system of FIG. 4 illustrating the screen tensioning and clamping forces.

As shown in FIG. 5, the clamping force C comprises a first component 29 normal to the inclined frame element engaging face 25 of the support member 22 and support face 26 of the first (or second) frame element 13 (14) tending to clamp these together, and a second component 30 parallel to these faces 25, 26 tending to slide the support member 22 down the inclined support face 26 of the first (or second) frame element 13 (14). It will be appreciated that this will result in a horizontal force 31 being extended at each end of the screen mesh panel 19 thereby stretching it across the support frame 12. It will further be appreciated that the tension applied to the screen mesh panel 19 will depend not only on the clamping force C exerted by the clamping tube 27, but also on the angle of the inclined faces 25, 26 of the frame element 13 and support member 22 and varied to accomodate different screening conditions maximum G force applied by machine and required mesh tension etc. If a steeper angle is used then the first force component 29 will be reduced whilst the second force component 30 is increased.

Figure 3:
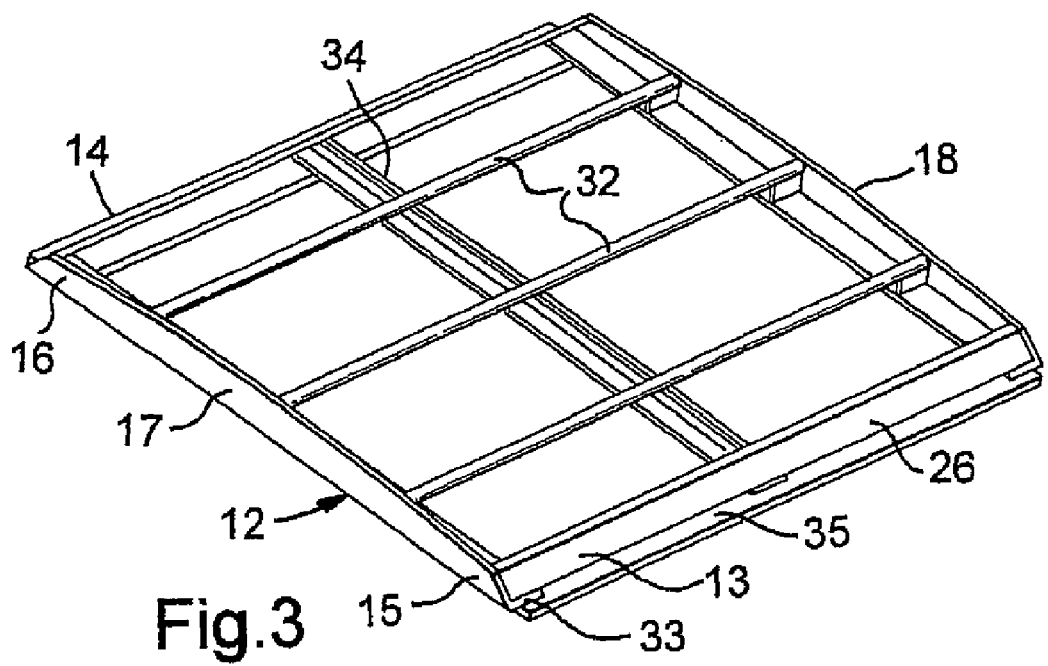
FIG. 3 is a perspective view of the support frame of the screen system of the apparatus of FIGS. 1 and 2.
Figure 4:
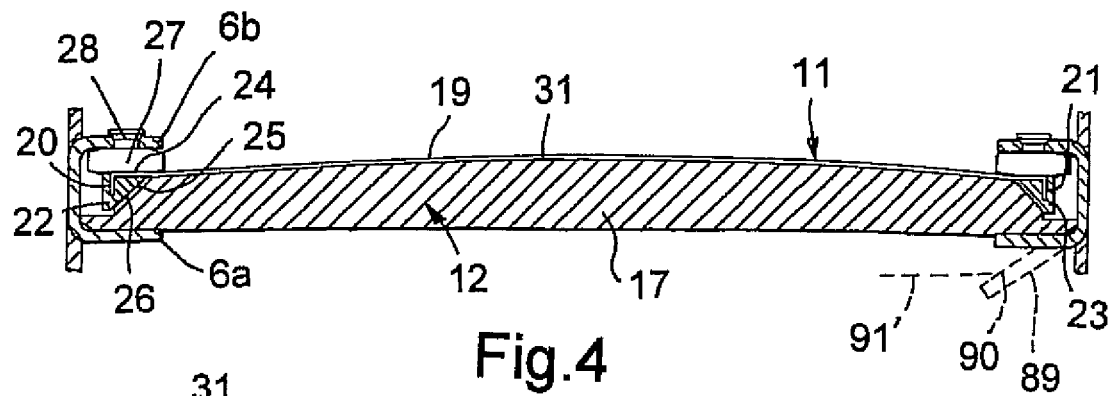
FIG. 4 is a detail sectional elevation of the apparatus of FIGS. 1 and 2 showing mounting of the screen system.

As may be seen in FIGS. 3 and 4 the further frame elements 17, 18 of the support frame 12 have convexly arcuate upper edges 31 to form a so-called crown deck across which the screen mesh panel 19 is stretched, so as to increase the rigidity and dimensional stability of the mesh panel 19 in use thereof during the vibratory screening process. Additional support to the mesh panel 19 is also provided by a series of spaced apart mesh support elements 32 between and parallel to the first and second frame elements 13, 14 as shown in FIG. 3. As may also be seen in FIG. 3 the further frame elements 17 and 18 are in the form of angle sections 33 to impart greater rigidity to the support frame 12, which is further enhanced by various additional bracing and support elements 34, 35. Since the mesh support elements 32 are subjected to wear from the screen elements which they support, advantageously there are used sacrificial support elements in the form of rods captively mounted in 'C'-shaped recesses, which can be readily replaced as required.

Figure 2:
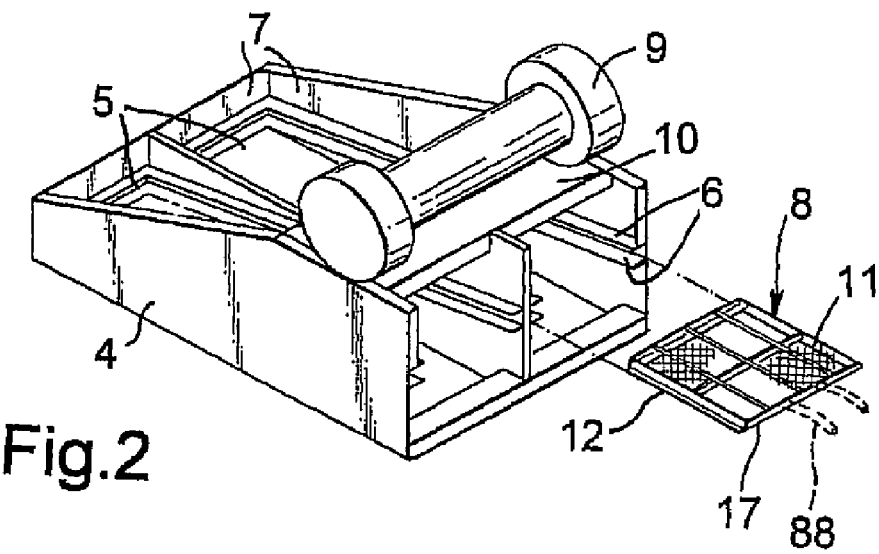
FIG. 2 is a perspective view of the principal parts of the apparatus of FIG. 1.

As may be seen from FIG. 2, each basket 5 is formed and arranged to mount therein a plurality of screen systems B (only one shown). When a screen element 11 needs to be replaced the clamping tube 27 can be simply deflated and the screen system 8 withdrawn, the screen element 11 removed from the support frame 12, and a new screen element 11 put in its place, whereupon the thus restored screen system 8 can be reinstalled and clamped into place.

As it is only necessary to replace the screen element when the mesh panel is damaged in use, or, for example, in order to use a screen element with a different mesh aperture size, the screen system of the present invention is economically beneficial and convenient. In addition less material is required for screen system manufacture; storage space requirements, packaging requirements and transport costs of the screens are reduced; and the reduced volume of discarded screen components for disposal has a reduced impact on the environment.

Figure 6:
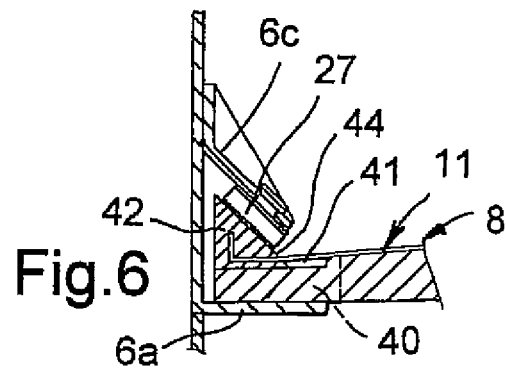
FIGS. 6 and 7 are detail views corresponding generally to FIGS. 4 and 5 illustrating a second embodiment of the invention.
Figure 7:
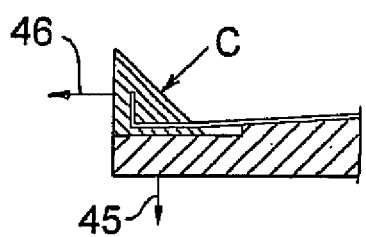

FIG. 6 shows a modified embodiment of screen system and clamping arrangement in which like parts corresponding to those in the first embodiment are indicated by like reference numerals. In this case the support frame 12 has first and second frame elements 40 with a horizontal support face 41 upon which a wedge-section support member 42 of the screen element 11 is supported. In this case the support member 42 has a lower horizontal, frame element engaging, face 43 and an upper clamping force receiving face 44 inclined upwardly outwardly of the screen element 11. The screen system 8 is supported on a horizontally projecting lower flange 6a as before, but the clamping tube 27 in this case is mounted in an inclined upper flange 6c extending parallel to the inclined clamping force receiving face 44 of the support member 42 so that the clamping force C can be applied normally thereto The resulting clamping and screen tensioning force components 45, 46 are shown in FIG. 7. This arrangement has the advantage of increasing the tensioning force on the screen element and improving control thereof.

Figure 8:
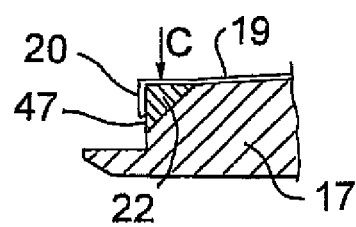
FIGS. 8 and 9 are detail views corresponding generally to FIG. 4 illustrating third and fourth embodiments of the invention.

FIG. 8 shows a further modified embodiment similar to that of FIGS. 1 to 5, in which the cranked end portions 20 of the screen mesh panel 19 instead of being anchored in slots within the support members 22, 23 are hooked over the vertically extending outer face 47 of the wedge-section support member 22—aid end portions 20 being made sufficiently rigid to maintain their configuration when the screen mesh panel 19 is fully tensioned. In this case the screen mesh panel 19 may be just lightly bonded e.g. with suitable adhesive to the support member 22, or could just rely entirely on the clamping together of the screen mesh panel 19r support members 22, 23 and support frame 12, components of the screen system, when mounted in a basket 5, to retain the screen mesh panel 19 to the support members 22, 23.

Figure 9:
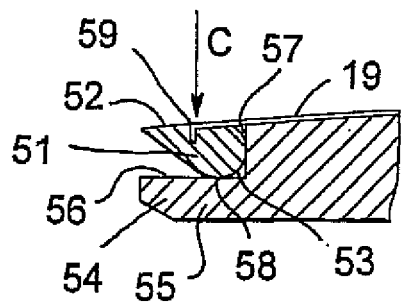

FIG. 9 illustrates yet another type of embodiment, in which there is used a support member 51 having a generally wedge shaped profile with an upper side 52 providing a generally horizontal upper clamping force C receiving face and a convex arcuate side 53 providing a cam surface. The support member 51 is supported on a step 54 provided on a respective first or second frame element 55 with said cam portion surface 53 engaging with the platform 56 and riser 57 of said step 54. In this case, when a clamping force C is applied to the support member 51 outwardly of the fulcrum 58 constituted by a part of said cam surface 53 which engages said platform 56 of said step 54, the support member 51 tends to roll on the step 54 while remaining in engagement with the riser 57 thereof, thereby displacing outwardly the connection 59 of the mesh panel 19 to the support member 51, thus tensioning the screen mesh panel 19 as well as clamping the screen element 11, and support frame 12 together between the basket flanges as before. It will be understood that various other support member geometries having a suitable clamp force receiving face and cam surface could be used.

Figure 10:
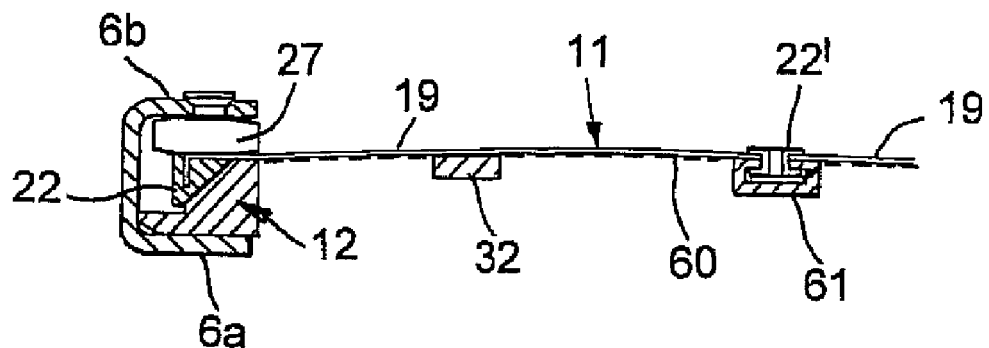
FIGS. 10 and 11 are detail cross sectional views of fifth and sixth embodiments of multi-mesh panel screen systems of the invention.

FIG. 10 shows an embodiment of the present invention where the screen system comprises a plurality of interengaged screen elements at least one of which has a screen support member 22 clamped and secured to an elongated frame element 3 of a support frame 12 between support flanges 6a and 6b of a vibratory screening apparatus basket as described in FIG. 4. The mesh panels 19 of the screen element comprise one or more mesh layers secured to an apertured plate 60 at least two of which have second screen support member 22. The second screen support member 22 has an elongated hook for capture engagement in a hook engaging recess 61 of an elongate frame element of said support frame to interengage and secure said screen element to said support frame. Further support for said screen element is provided by additional frame elements 32.

Figure 11:
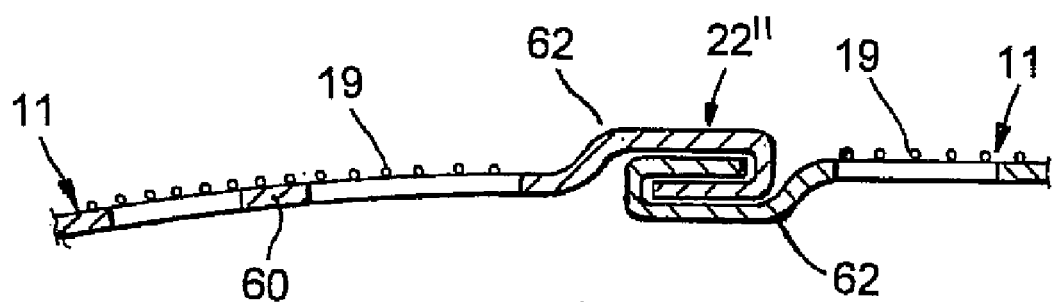

FIG. 11 is a detail sectional view showing an example of a means for interconnection of two mesh panels 19 of the present invention. (The other ends of the mesh panels not shown in the figure could be in the form of any of the various support members shown in FIGS. 4 to 9. The other end of such a mesh panel 19 could also be in the form of a further mesh panel interconnection means for use in a case where a serial array of 3 or more mesh panels is provided between two support members).

In more detail FIG. 11 shows end portions 62 of two mesh panels 19 having support members hook sections 22. The hook sections 22 are formed and arranged so as to maintain the mesh panels 19 in secure interengagement with each other when the screen element 11 is tensioned across the support frame 12.

Figure 12:
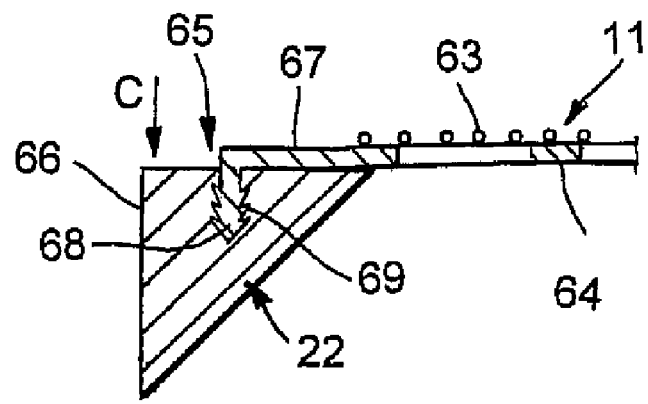
FIG. 12 is a detail view of one end of a seventh embodiment of a screen element of the invention.

FIG. 12 shows part of another embodiment of a screen element 11 in which a mesh panel 19 comprising a wire screen mesh 63 bonded to an apertured support plate 64 is anchored 65 to a clamping force receiving screen support member body 66. In more detail the end 67 of the apertured plate 64 is cranked downwardly and provided with ratchet tooth formations 68 for push fit locking interengagement in a generally complementary slot 69 in the screen support member body 66, said cranked end 67 effectively constituting a support member anchorage portion, which combines together with the support member body 66 to form together therewith, a support member 22 for the mesh panel 19.

Figure 13:
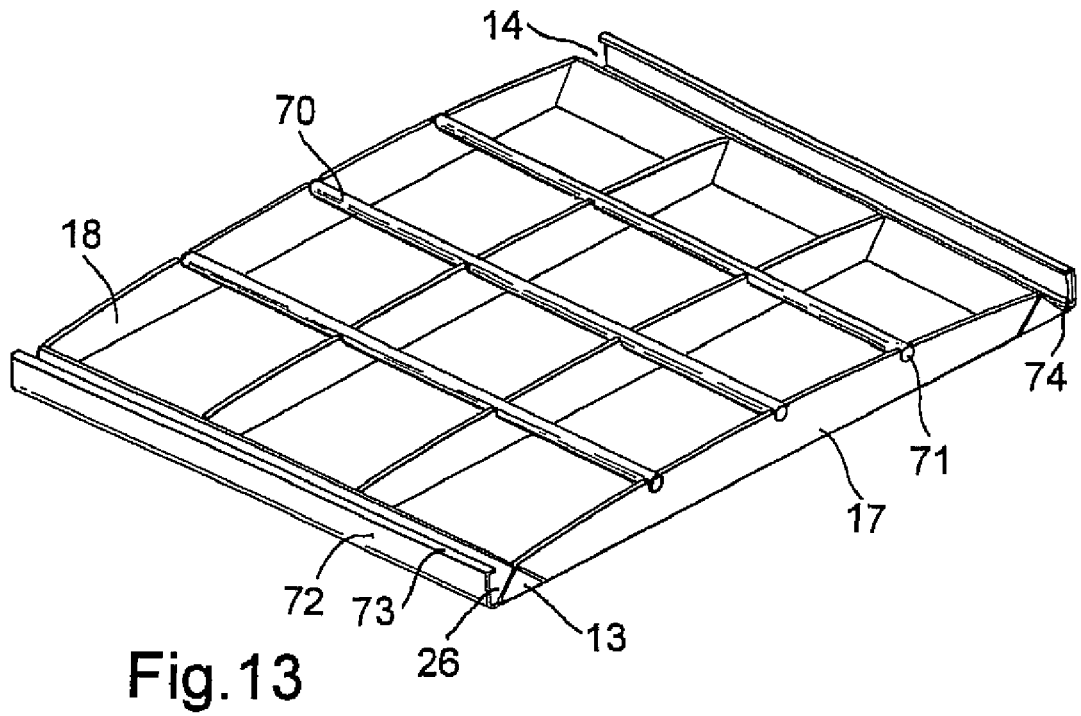
FIG. 13 is a perspective view of another support frame embodiment.

FIG. 13 shows a support frame generally similar to that of FIG. 3. In this case though there are used replacable sacrificial spaced apart mesh support elements 70 mounted in 'C'-section apertures 71 in the third and fourth frame elements 17, 18. Also the first and second frame elements 13, 14 are extended outwardly with an upwardly extending web 72 opposite the inclined face 26, which web 72 is turned back inwardly at its upper edge 73 to form a retaining flange 74.

Figure 14:
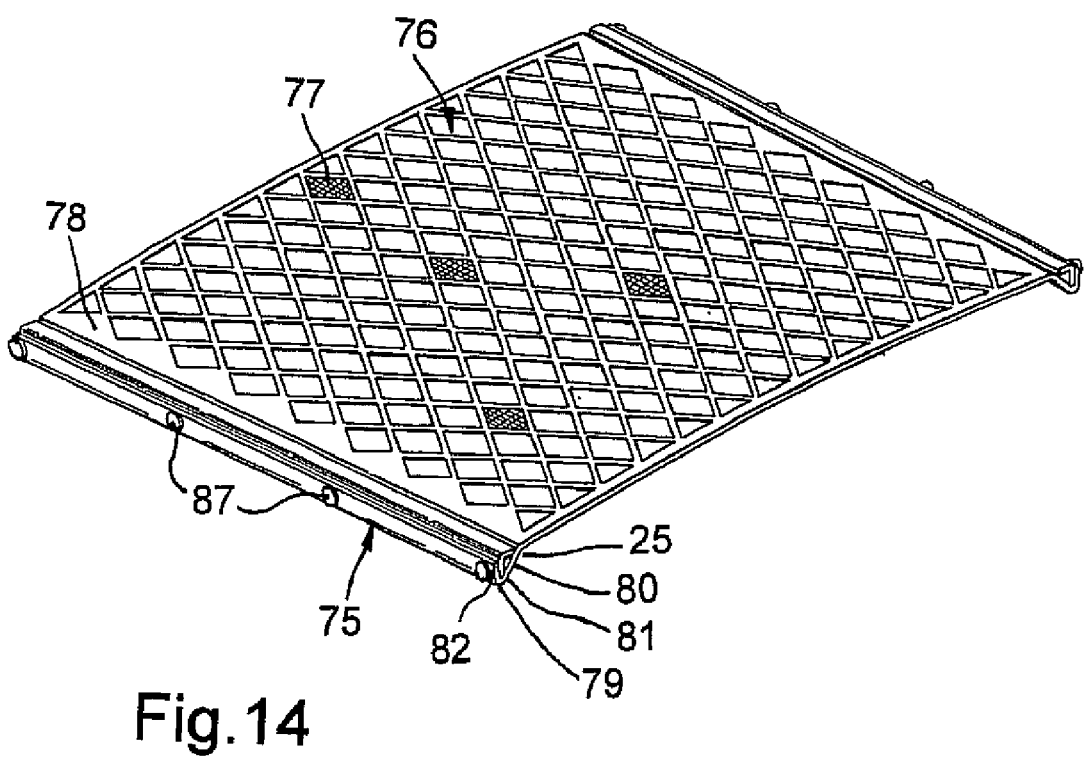
FIG. 14 is a perspective view of a screen element for use with the support frame of FIG. 13.

FIG. 14 shows a screen element 75 in the form of a mesh panel 76 in which mesh 77 is supported on an apertured support plate 78. The support plate 78 is typically of mild steel around 3 mm thick which (in its apertured form) is relatively lightweight and flexible, but nevertheless sufficiently dimensionally stable to support the suitably tensioned mesh 77. The latter is secured to the support plate 78 by embedding, in generally known manner, in a polyethylene or polyamide coating which typically has a thickness of the order of 0.5 to 1.2 mm. Outer edge portions 79 of the support plate 7B are cranked downwardly and then upwardly to provide an inclined web portion 80 presenting at its underside 81 a first or second frame element engaging face 25, and then an upright web portion 82. As may more readily be seen in FIG. 15, the upright web portion 82 has secured 83 thereto an 'L'-section angle element 84 which presents a generally horizontally extending clamping force receiving face 24 closely underneath 25 an inflatable clamping tube 27.

Figure 15:
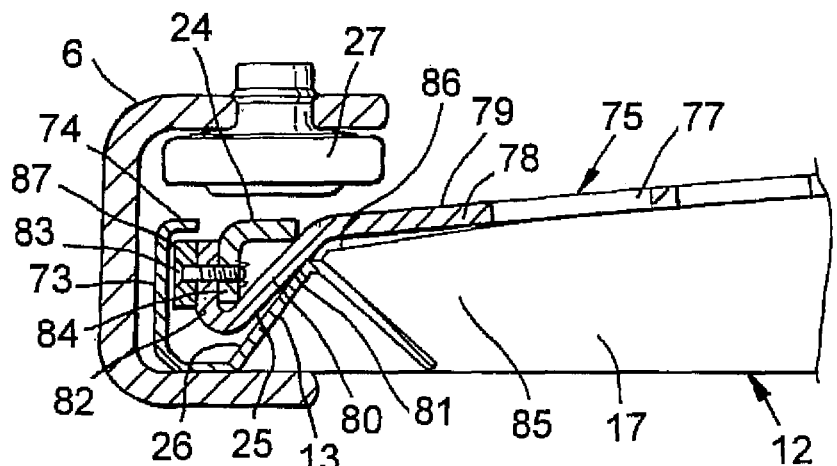
FIG. 15 is a detail sectional elevation showing mounting of the screen system of FIGS. 13 and 14, in a screening apparatus.

As may be seen in FIG. 15, the inclined support face 26 of the first and second frame elements 13, 14, is at a slightly steeper angle than that of the first or second frame element engaging face 25 when the screen element 75 is supported on the third and fourth frame elements 17, 18. Also the outer edge portion 85 of the latter is cutaway slightly to provide a small clearance gap 86 under the support plate 78 thereat. These features help to prevent local deformation of the mesh 77 when the clamping force applied by the tubular clamping element 27 is increased in order to secure the screen element 75 to the support frame 12.

In order to help retain the screen element 75 in position on the support frame 12 during installation thereof, the upright web portion 82 of the support plate 78 also has secured 83 thereto low friction guide elements such as small guide discs 87 which are retained captively under the retaining flanges 74 of the support frame 17. The guide discs 87 also help to facilitate mounting of the screen element 75 in the support frame 12 and withdrawal therefrom.

It will be appreciated that various modifications of the above described embodiments may be made without departing from the scope of the present invention. Thus for example individual screen elements of the present invention could incorporate combinations of different ones of the above described support embers at each end. Also the (or an outermost) support frame 12 may be provided on its third frame element 17 with an outwardly facing guide 88 (see FIG. 2), which directs the screen element 11 upwardly over and onto the top of the support frame 12 when the screen element 11 is fed into the runners 6 with a support frame 12 already in place therein.

Furthermore as shown in FIG. 4, the lower runners 89 could be downwardly inclined towards each other so that when correspondingly inclined engagement surfaces 90 at the underside 91 of the support frame 12 seat thereon, the support frame is automatically centralised in the runner supports of the screening apparatus.

Figure 16:
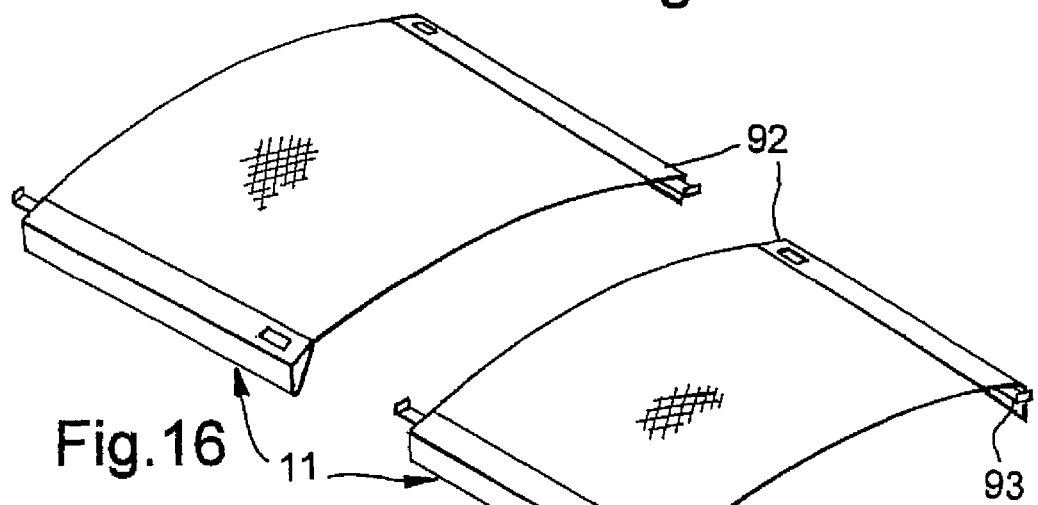
FIG. 16 is a perspective view of a screen element having a hook and an aperture.

As described above with reference to FIG. 2, each basket 5 has a series of screen systems 8 mounted thereover. Normally the support frames 12 remain in position in the apparatus 1 and only the screen elements 11 need to be removed and replaced. In order to facilitate this process, the screen elements 11 are provided at each corner 92 with respective ones of hook 93 and aperture 94 formations so that the screen elements 11 can be releasably interconnected together, as shown in FIG. 16.

Figure 17:
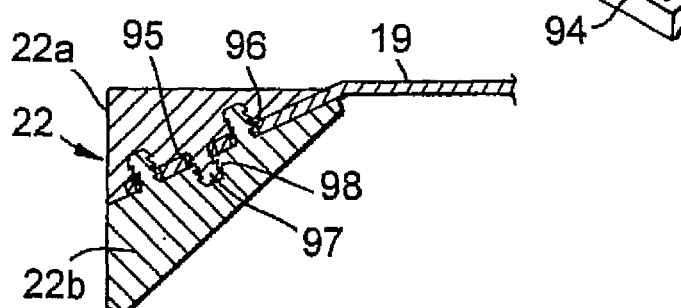
FIG. 17 is a cross-sectional view of a screen support member.

Also in order to facilitate connection of the mesh panels 19 to the screen support members 22, there may be used support members in the form of two or more screen support member components 22a, 22b formed and arranged so as to snap fit together sandwiching the anchor portion edges 95 of the mesh panels 19 therebetween as illustrated in FIG. 17. In more detail, the anchor portion edges 95 are provided with apertures 96 through which project barbed studs 97 which engage in complementary sockets 98 for secure captive interengagement with each other.

The invention claimed is:

1. A screen system suitable for use in a basket in a vibratory screen apparatus said basket having a clamping system said screen system comprising:
    a screen element disposed on a support frame, said support frame being provided with spaced apart first and second elongate frame elements including a support face and further elongate frame elements extending between said first and second frame elements for supporting a mesh panel of said screen element, wherein said mesh panel includes first and second elongate support members extending along opposite end portions of said mesh panel, said first and second support members including a clamping force receiving face and a frame element engaging face, said first and second support members being formed and arranged for secure interengagement with said first and second frame elements with at least one of said first and second support members and said support face being formed and arranged so that when said at least one first and second support member is clamped to said support face of the respective one of said first and second frame elements by said clamping system, said at least one first and second support member is subjected to a force component substantially in the principal plane of said mesh panel, so that said mesh panel is securely held under tension against said further frame elements and said respective one of said first and second frame elements is clamped together with said at least one first and second support member in the basket;
    wherein at least one of said first and second elongate support members, for interengagement with said first and second frame elements, has a cam portion formed and arranged for interaction with the respective frame element, so that when a clamping force (C) is applied by said clamping system to a clamp force receiving face of said at least one of said first and second support members, in use of the screen system, to clamp said support members onto the respective one of said first and second frame elements, a said at least one support member is rotated relative to said frame element, so as to tension the screen element so that the mesh panel is securely held under tension against said further frame elements;
    wherein said clamping system comprises a collapsible tube and wherein the further frame elements include convexly arcuate support surfaces forming a crown deck.

2. A screen system as claimed in claim 1 wherein the mesh panel is in the form of unsupported mesh.

3. A screen system as claimed in claim 1 wherein the mesh panel is in the form of pretensioned mesh secured to an apertured support panel.

4. A screen system as claimed in claim 3 wherein said apertured support panel has apertures of a plurality of different sizes or shapes.

5. A screen system as claimed in claim 3 wherein at least one of said first and second support members is formed integrally with said apertured support panel.

6. A screen system as claimed in claim 1 wherein at least one of said first and second support members is releasably secured to the mesh panel.

7. A screen system as claimed in claim 1 wherein said mesh panel comprises a plurality of interconnected mesh panel sections.

8. A screen system as claimed in claim 1 wherein each of the first and second support members includes at least one mesh panel end portion with a releasable interengagement formation for coupling together two screen elements to facilitate withdrawal thereof from the vibratory screen apparatus having the basket.

9. A screen system as claimed in claim 1 wherein one of said first and second support members and the respective elongate frame elements is formed and arranged for clamping together so as to apply a tensioning force to the screen element to securely hold the mesh panel, under tension against the further frame elements and the other support members and the respective elongate frame elements comprises a secure captive interengagement device.

10. A screen system as claimed in claim 1 wherein said clamping system comprises a collapsible tube filled with pressurized fluid such as compressed air or a liquid such as water or hydraulic fluid.

11. A screen system as claimed in claim 1 wherein the support frame includes additional elongate frame elements disposed between said first and second frame elements and said further frame elements for providing additional support to the mesh panel.

12. A screen system as claimed in claim 1 wherein a single support frame is formed and arranged so as to support a plurality of screen elements disposed generally side by side, abutting or cascading across said support frame, wherein the support frame is supported by additional intermediate frame elements between the elongate first and second frame elements.

13. A screen system as claimed in claim 1 wherein the further frame elements include convexly arcuate support surfaces forming a crown deck wherein the mesh panel adopts a generally part-cylindrical or part elliptical-section form.

14. A screen system as claimed in claim 1 wherein said mesh panel comprises a plurality of superposed mesh layers which are held together onto said first and second elongate support members.

15. A screen system as claimed in claim 1 wherein said clamping system secures said screen element to the said support frame and the support frame is separately secured to said basket.

16. A screen system as claimed in claim 1 wherein said clamping system is used both to secure the screen system in said basket and to secure said screen support members, and said first and second frame elements together securely holding said mesh panel under tension against said further frame elements.

17. A screen system as claimed in claim 1 wherein said elongate support members each have a clamping force receiving support member anchorage portion comprising an elongate section formation, with at least one enlarged thickness head portion for lateral sliding interengagement with a corresponding female formation of the mesh panel clamping force receiving portion of said support member.

18. A screen system as claimed in claim 1 wherein said support frame is formed and arranged so that said first and second frame elements are immovable relative to the main body of the support frame.

19. A screen system as claimed in claim 1 wherein said support frame is formed and arranged so that said at least one of said screen element support members and the respective one of said first and second frame elements are formed and arranged so that clamping thereof together against support runners provided for the screen system concomitantly tensions said mesh panel against said further frame elements.

20. A method of mounting a screen system in a vibratory screen apparatus comprising the steps of:
  providing a basket having a support frame secured thereto, said support frame being provided with spaced apart first and second elongate frame elements including a support face and further elongate frame elements extending between said first and second frame elements for supporting a mesh panel of a screen element;
  providing said screen element including first and second elongate support members extending along opposite end portions of said mesh panel, said first and second support members including a clamping force receiving face and a frame element engaging face, and wherein at least one of said first and second elongate support members has a cam portion formed and arranged for interaction with a respective frame element;
  providing at least one clamping system for securing said screen element to the support frame;
  inserting said screen element into said basket wherein said support frame is secured; and
  activating said at least one clamping system so as to clamp said screen element securely to said support frame, whereby said at least one clamping system will concomitantly tension said mesh panel by rotation of the cam portion of a support member relative to a respective frame element;
  wherein said clamping system comprises a collapsible tube and wherein the further frame elements include convexly arcuate support surfaces forming a crown deck.

21. A method of mounting a screen system in a vibratory screen apparatus comprising the steps of:
  providing a basket having screen system support runners formed and arranged for sliding insertion and removal of the screen system, each one of said support runners provided with at least one clamping system;
  providing a screen element including a mesh panel having first and second elongate support members extending along opposite end portions of said mesh panel, said first and second support members including a clamping force receiving face and a frame element engaging face, and wherein at least one of said first and second elongate support members has a cam portion formed and arranged for interaction with a respective frame element;
  providing a support frame with spaced apart first and second elongate frame elements including a support face and further elongate frame elements extending between said first and second frame elements for supporting a said mesh panel of a screen element;
  inserting said screen element into said basket wherein said support frame is supported in said support runners; and
  activating said at least one clamping system so as to clamp said screen element securely together with said support frame to said support runners, whereby said at least one clamping system will concomitantly tension said mesh panel by rotation of the cam portion of a support member relative to a respective frame element and clamp together said support frame to said support runner;
  wherein said clamping system comprises a collapsible tube and wherein the further frame elements include convexly arcuate support surfaces forming a crown deck.

22. A method of screening a fluidised particulate material suspended in a liquid medium, said method comprising the steps of:
  providing a vibratory screening apparatus having a basket wherein a screen element is disposed on a support frame, said support frame being provided with spaced apart first and second elongate frame elements including a support face and further elongate frame elements extending between said first and second frame elements for supporting-a mesh panel of said screen element, wherein said mesh panel includes first and second elongate support members extending along opposite end portions of said mesh panel, said first and second support members including a clamping force receiving face and a frame element engaging face and wherein at least one of said first and second elongate support members, has a cam portion formed and arranged for interaction with the respective frame element, said first and second support members being formed and arranged for secure interengagement with said first and second frame elements, with at least one of said first and second support members and said support face being formed and arranged so that when a clamping force (C) is applied by a clamping system to a clamp force receiving face of said at least one of said first and second support members, in use of the screen element, to clamp said support members onto the respective one of said first and second frame elements, a said at least one support member is rotated relative to said frame element, so as to tension the screen element so that the mesh panel is securely held under tension against said further frame elements;
  activating a vibratory unit of said vibratory screen apparatus; and
  feeding said fluidised particulate material onto an upper surface of said screen element;
  wherein said clamping system comprises a collapsible tube and wherein the further frame elements include convexly arcuate support surfaces forming a crown deck.

* * * * *

UNITED STATES PATENT AND TRADEMARK OFFICE
CERTIFICATE OF CORRECTION

| | | |
|---|---|---|
| PATENT NO. | : 7,850,011 B2 | Page 1 of 1 |
| APPLICATION NO. | : 11/689692 | |
| DATED | : December 14, 2010 | |
| INVENTOR(S) | : George W. Fisher and Marshall G. Bailey | |

It is certified that error appears in the above-identified patent and that said Letters Patent is hereby corrected as shown below:

Column 9, line 61, replace "B" with --8--

Column 10, line 34, replace "B" with --8--

Column 12, line 30, replace "7B" with --78--

Signed and Sealed this
First Day of March, 2011

David J. Kappos
*Director of the United States Patent and Trademark Office*